United States Patent
Cheng et al.

(10) Patent No.: US 8,217,618 B2
(45) Date of Patent: Jul. 10, 2012

(54) ENERGY-SAVING CONTROLLER FOR THREE-PHASE INDUCTION MOTORS

(75) Inventors: Ka Wai Eric Cheng, Kowloon (HK); Xiangdang Xue, Kowloon (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 623 days.

(21) Appl. No.: 12/379,394

(22) Filed: Feb. 20, 2009

(65) Prior Publication Data

US 2010/0213886 A1    Aug. 26, 2010

(51) Int. Cl.
*H02P 3/18* (2006.01)
(52) U.S. Cl. ......... 318/812; 318/727; 318/800; 318/809
(58) Field of Classification Search .................. 318/727, 318/798, 800, 809, 812, 813, 830
See application file for complete search history.

(56) References Cited

U.S. PATENT DOCUMENTS

| | | | | |
|---|---|---|---|---|
| 4,450,398 A * | 5/1984 | Bose | ............................ | 318/803 |
| 4,562,396 A * | 12/1985 | Espelage et al. | ............. | 318/809 |
| 4,636,702 A * | 1/1987 | Hedges | ......................... | 318/729 |
| 4,833,389 A * | 5/1989 | Kovalsky et al. | ............. | 318/803 |
| 4,833,628 A * | 5/1989 | Curran, Jr. | ..................... | 318/800 |
| 4,912,390 A * | 3/1990 | Curran et al. | ................. | 318/812 |
| 4,940,927 A | 7/1990 | Fisher | | |
| 5,010,471 A | 4/1991 | Klaassens et al. | | |
| 5,471,127 A * | 11/1995 | Vaughan et al. | ............. | 318/809 |
| 5,682,091 A * | 10/1997 | Williamson et al. | .......... | 318/800 |
| 5,701,066 A | 12/1997 | Matsuura et al. | | |
| 5,723,966 A * | 3/1998 | Straka et al. | ................... | 318/650 |
| 5,814,966 A * | 9/1998 | Williamson et al. | .......... | 318/798 |
| 6,774,601 B2 * | 8/2004 | Schwartz et al. | ............. | 318/727 |
| 6,828,751 B2 | 12/2004 | Sadasivam et al. | | |

\* cited by examiner

*Primary Examiner* — Walter Benson
*Assistant Examiner* — Thai Dinh
(74) *Attorney, Agent, or Firm* — The Hong Kong Polytechnic University

(57) ABSTRACT

The present invention relates to an energy-saving system for three-phase induction motors and is based on the principle of variable voltage control at constant speed. It is composed of a microprocessor, exampling circuit, sensing circuit, acquiring circuit, firing circuit, and AC to AC converter. The system is to automatically adjust the voltage to the induction motor with the variation in the motor load, in order to obtain high operating power factor and efficiency. The system will result in considerable energy-savings when a three-phase induction motor runs under constant light-load or variable-load with low duty ratio.

12 Claims, 4 Drawing Sheets

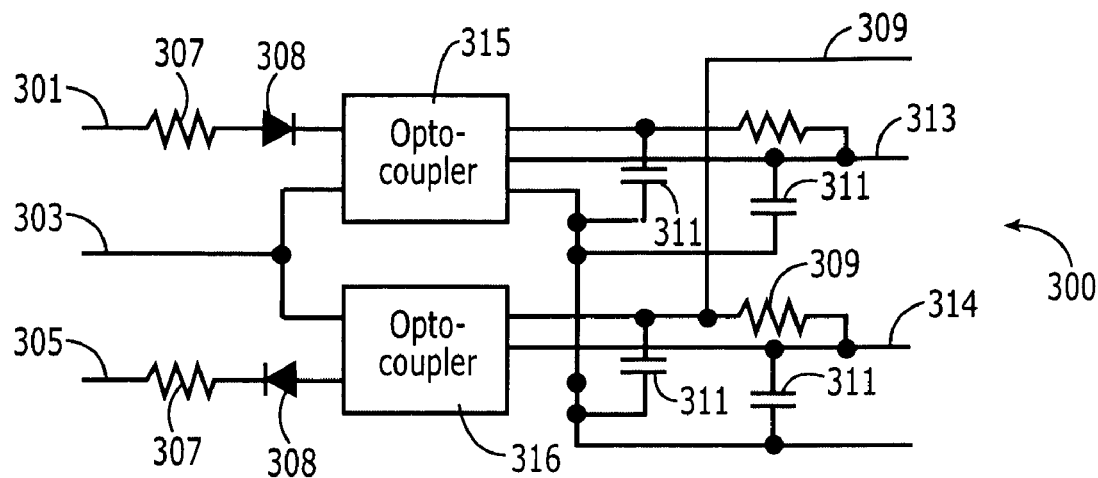
FIG. 3
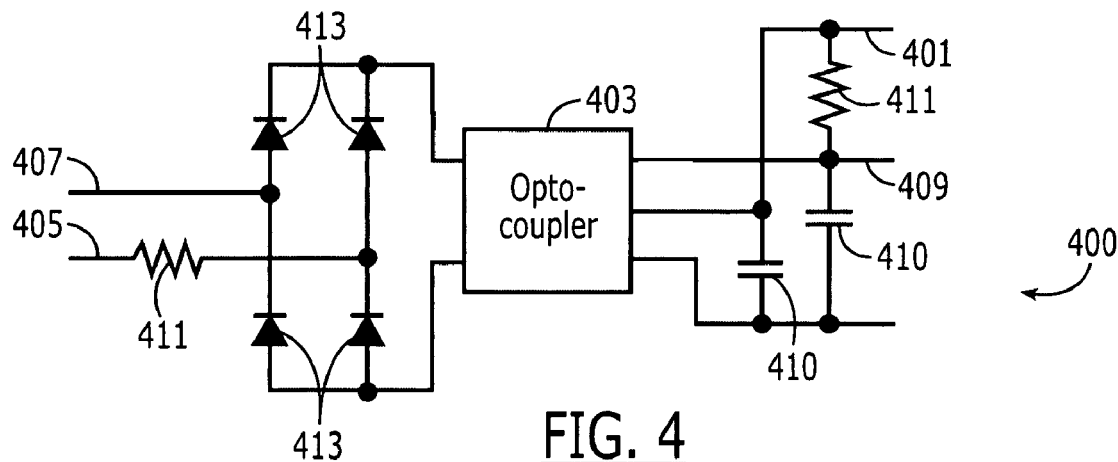
FIG. 4
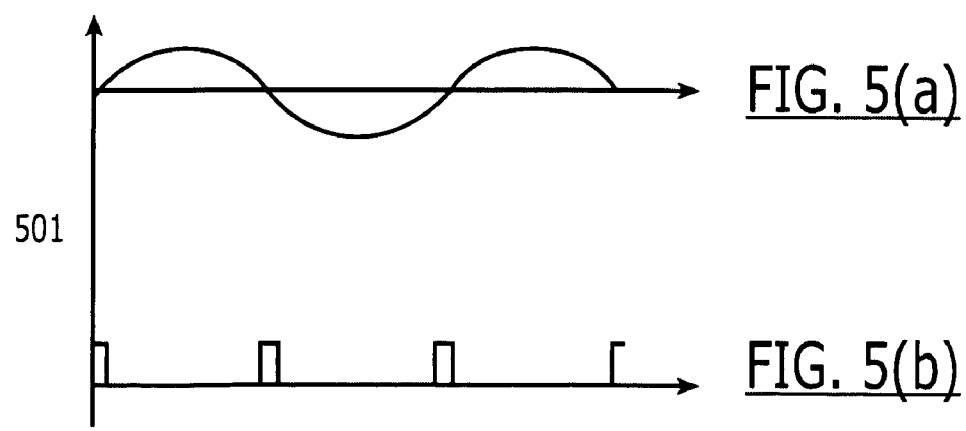
FIG. 5(a)
FIG. 5(b)

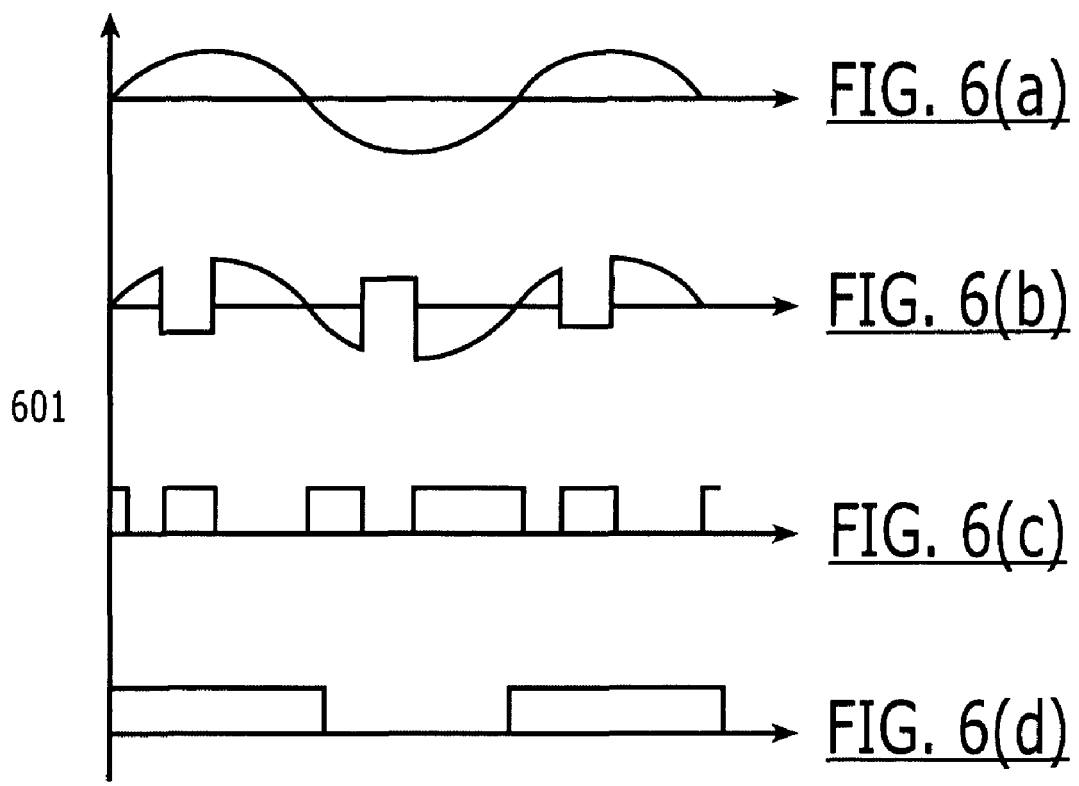
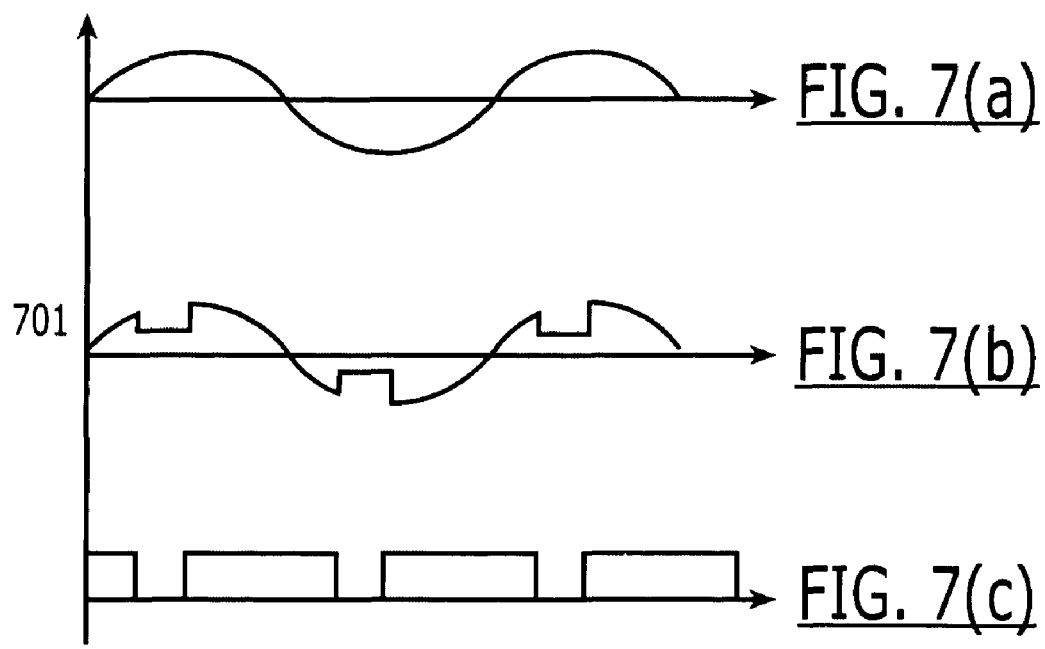

ENERGY-SAVING CONTROLLER FOR THREE-PHASE INDUCTION MOTORS

BACKGROUND OF THE INVENTION

1. Field of the Invention

The invention relates to energy-saving devices, more specifically, the invention relates to energy-saving controller for three-phase induction motors.

2. Description of the Related Art

The design of induction motors ensures that the motors have high operating power factor and efficiency when they run in the load range from 75% to 100% full load. Thus, high operating power factor and efficiency can be obtained when induction motors run at heavy-load. However, induction motors have low operating power factor and efficiency when they run at light-load or variable-load with low duty ratio.

It is an object of the present invention to improve upon the current design of controllers for induction motors.

SUMMARY OF THE INVENTION

The present invention relates to a system for controlling three-phase induction motors operating under a constant light load or a variable load with low duty ratio. Including electronic components, the system is able to automatically adjust a voltage to the induction motor to match the variation in a load, thus achieving a high operating power factor and efficiency in the motor.

According to an aspect of the present invention, a controller for a three-phase induction motor including an exampling circuit configured to check a zero passing point of three-phase source voltages and output a first signal, a sensing circuit configured to sense variation in a motor load and output a second signal and a third signal, an acquiring circuit configured to check the zero-passing point of motor current and output a forth signal, a processing unit configured to receive the first signal from the exampling circuit and compute a firing angle based on the first signal, a firing circuit configured to receive a fifth signal from the processing unit and output a sixth signal based on the fifth signal, and an AC to AC converter configured to drive the three-phase induction motor based on the sixth signal.

These and other features, aspects, and advantages of the apparatus and methods of the present invention will become better understood from the following description, appended claims, and accompanying drawings.

BRIEF DESCRIPTION OF THE DRAWINGS

FIG. 3 is an exemplary embodiment of a sensing circuit useful in the present system.

FIG. 4 is an exemplary embodiment of an acquiring circuit useful in the present system.

FIG. 5 is an exemplary schematic waveform of the exampling circuit shown in FIG. 2.

FIG. 6 is an exemplary schematic waveform of the sensing circuit shown in FIG. 3.

FIG. 7 is an exemplary schematic embodiment of the acquiring circuit shown in FIG. 4.

DESCRIPTION OF THE EMBODIMENTS

The following description of certain exemplary embodiment(s) is merely exemplary in nature and is in no way intended to limit the invention, its application, or uses.

Figure 1:
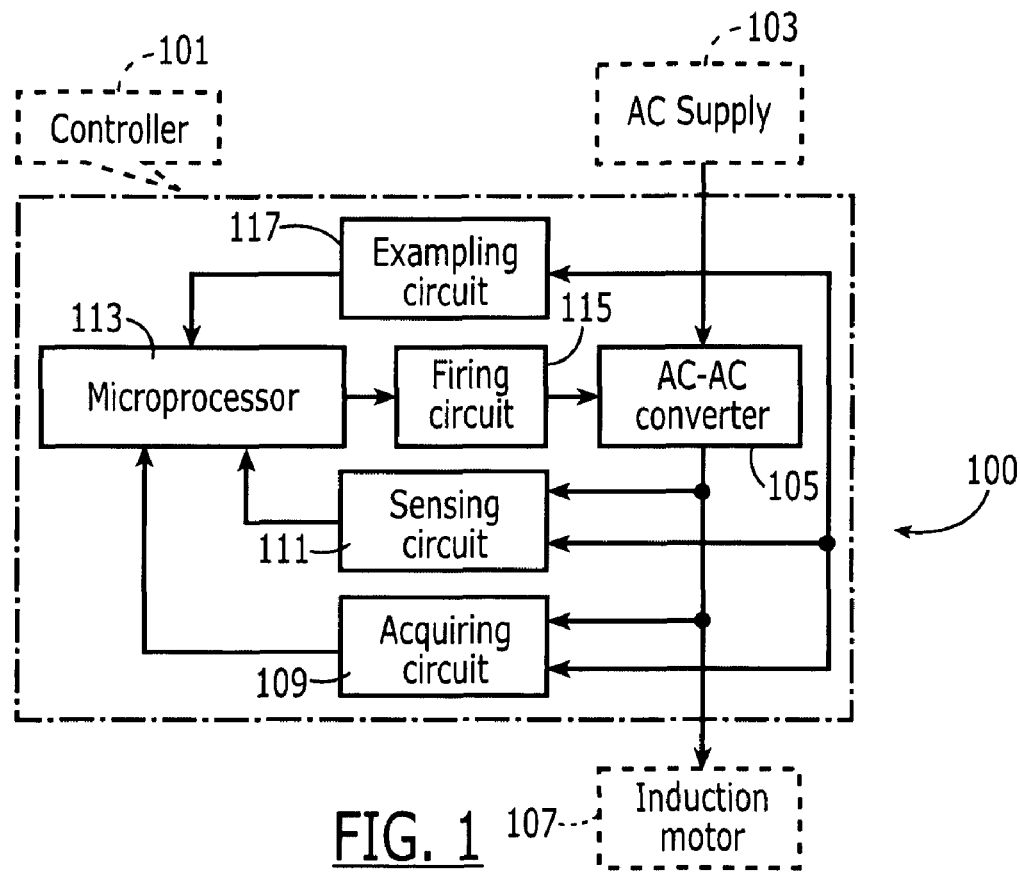
FIG. 1 is an exemplary embodiment of a circuit of the present system.

FIG. 1 is an embodiment of the system 100 of the present invention having numerous circuits, including an exampling circuit 117, a firing circuit 115, a sensing circuit 111, an acquiring circuit 109, a microprocessor 113, and an AC-AC converter 105. The controller 101 is to be used in conjunction with a power supply such as AC power supply 103, a three-phase induction motor 107. As will be discussed later, the various circuits work in conjunction with one another to successfully control the three-phase induction motor 107 in accordance with this invention.

The acquiring circuit 109 serves for acquiring the current zero-passing point, which occurs at the point where the alternation changes direction during one cycle of the current. The acquiring circuit 109 can be comprised of one or more resistors, diodes, capacitors, inductors, and the like. In one embodiment, the acquiring circuit 109 further includes an opto-isolator, also known as an opto coupler. In use, the output from the acquiring circuit 109 is changing directions. The output is delivered to the microprocessor 113.

The system 100 also includes a sensing circuit 111. The sensing circuit 111 is used for sensing or detecting variation in the induction motor load. The sensing circuit 111 can include one or more selected from the group consisting of resistors, capacitors, inductors, opto-isolators (opto-couplers), and the like. In use, the sensing circuit 111 is able to determine when the motor load increases in response to an abnormal operation.

In one embodiment, the sensing circuit 111 outputs two signals, allowing for comparison. If one signal is "high" and the other signal is "low", the motor is determined to be running normally. If both signals are running high, the motor is determined to be running abnormally.

The system 100 further includes a digital controller, for example a digital signal processor (DSP) chip, microcontroller, or microprocessor 113. The digital controller is used for accepting output signals from the acquiring circuit 109, the sensing circuit 111, and the exampling circuit 117. The microprocessor 113 is capable of computing the maximum firing angle, either through algorithms stored thereon or by electronic switching means. Following maximum firing angle computation, an output signal from the digital controller is sent to the firing circuit 115. The output signal based on the maximum firing angle results in minimum three-phase voltages for implementing energy-saving when the induction motor operates within parameters.

A firing circuit 115, as stated previously, is included in the system 100. The firing circuit 115 accepts an output signal from the microprocessor 113, and thereafter generates an output signal used to drive a converter 105 for example a three-phase AC-AC converter. The firing circuit 115, being electronic circuitry, may include resistors, capacitors, inductors, opto-coupler, and the like.

An AC-AC converter 105 is included in the system 100, allowing the incoming current from a supply 103 to be adjusted to allow the induction motor 107 to continue to operate efficiently and as an energy saver, even in light of a less than full load. The converter 105 can be one well-known in the field, for example a transformer, or a cycloconverter system. The AC-AC converter 105 may include a uni-directional or bi-directional controlled rectifier, such as triacs and thyristors. Suitable converters are disclosed in, for example, U.S. Pat. No. 5,010,471.

Figure 2:
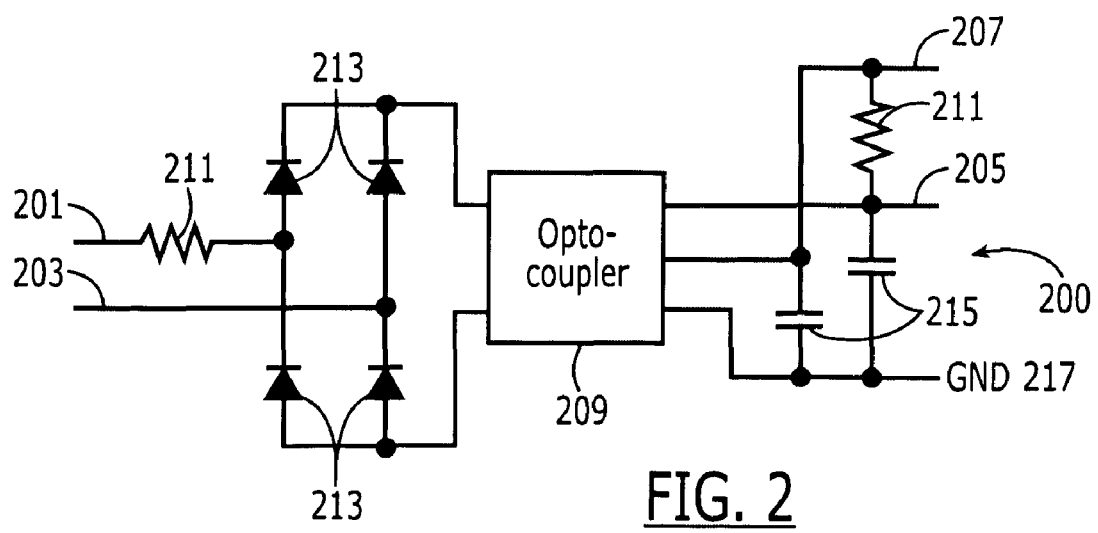
FIG. 2 is an exemplary embodiment of an exampling circuit useful in the present system.

FIG. 2 is an embodiment of an exampling circuit suitable for the present system. As stated previously, the exampling circuit checks the zero-passing point of the three-phase source voltages. In the embodiment of FIG. 2, an input voltage L 201, and a neutral line N 203 are directed to the circuit 200. A DC source voltage 205 is delivered to an opto-coupler 209. The output from the opto-coupler $E_1$ 207 is at a low level when the sinusoidal phase is larger or smaller than zero volt. The output $E_1$ 207 is equal to high level, when the point at which the sinusoidal phase is changing direction. In this embodiment, the exampling circuit possesses resistors 211, diodes 213, and capacitors 215.

FIG. 3 is an embodiment of a sensing circuit 300 as used in the present system. The sensing circuit 300 is used to sense the variation in the induction motor load. In the circuit 300, a terminal W 301 of the motor winding corresponds to an input line voltage L 305. The input N 303 denotes the neutral line of the AC source. The output $E_2$ 313 of an opto-coupler 315 and the output $E_3$ 314 of a second opto-coupler 316 are at a low level and a high level, respectively, during the positive half cycle of the input line voltage 305, when the motor is running normally. The present embodiment circuit 300 possesses numerous electrical components, including resistors 307/309, diodes 308, and capacitors 311.

FIG. 4 is an embodiment of an acquiring circuit 400, used in the present system, for checking the electric current zero-passing point. In this embodiment, W 405 represents a terminal of the motor winding corresponding to the line-voltage L 407. The output $E_4$ 401 of the opto-coupler 403 is at a low level when the phase current corresponding to the winding W 405 is equal to zero. $E_4$ 401 is at a high level when the phase current corresponding to the winding W 405 is not equal to zero. The circuit 400 includes electronic components including resistors 411, diodes 413, capacitors 410, and DC source voltage 409.

FIG. 5 is a graph exhibiting the performance of the exampling circuit in the present systems. As shown, when the phase voltage 501(*a*) is larger or smaller than zero voltage, the output $E_1$ 501(*b*) is at a low level. $E_1$ 501(*b*) is at a high level when the voltage 501(*a*) is at zero.

FIG. 6 graphs the performance of the sensing circuit and shows that, at a motor load W 601(*b*), the motor is running normally when the output $E_3$ 601(*d*) is at a high level and the output $E_2$ 601(*c*) is at a low level during the positive half cycle of the current L 601(*a*).

FIG. 7 graphs the performance of an acquiring circuit in the present system and shows that the output 701(*c*) from the acquiring circuit is at a high level when the phase current L 701(*a*) corresponding to the winding W 701(*b*) is not equal to zero. The output 701(*c*) is low when the phase current 701(*a*) is zero.

Figure 8:
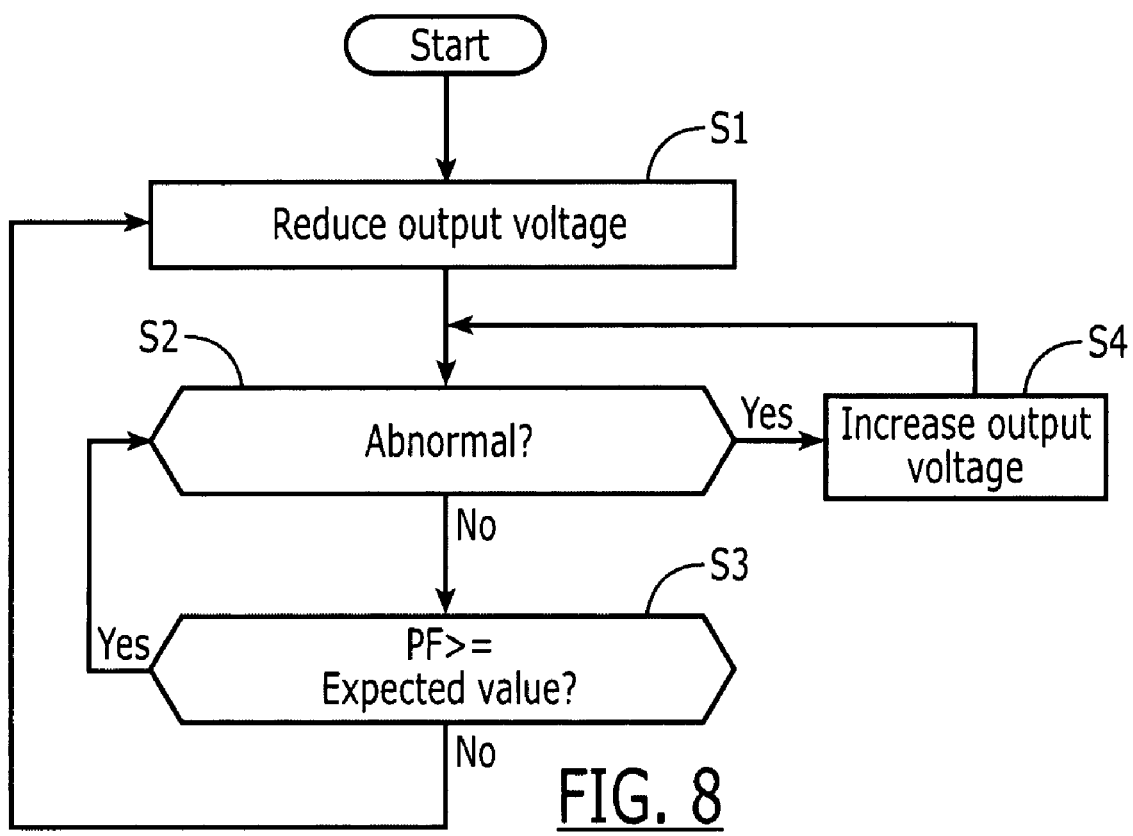
FIG. 8 is an exemplary control process of the microprocessor.

The control process of the microprocessor 113 is illustrated in the flow diagram of FIG. 8. The process begins when the microprocessor 113 received a signal from the exampling circuit 117. Upon receiving an output signal from the exampling circuit 117, the microprocessor computes the firing angle. In step S1, the firing angle is increased in order to reduce the output (to implement energy-saving). As described above, the firing angle is used to drive the AC-AC converter 105 via the firing circuit 115. Then the process advances to step S2.

In step S2, the microprocessor 113 determines whether the induction motor operates normally or abnormally based on output signals of the sensing circuit 111 and acquiring circuit 109 (i.e. $E_2$ and $E_3$ of FIG. 3; $E_4$ of FIG. 4). For example, the microprocessor 113 determines that it is an abnormal operation if $E_2$ is high level when $E_3$ is high level, and $E_4$ is low level. On the other hand, the microprocessor 113 determines that it is a normal operation if $E_2$ is low level when $E_3$ is high level, and $E_4$ is low level. In a case where the microprocessor determines that the induction motor is performing an abnormal operation (YES in step S2), the process advances to step S4. Otherwise, if the induction motor is performing a normal operation (NO in step S2), the process proceeds to step S3.

In step S3, the microprocessor 113 calculates the power factor (PF) from the output signals of the sensing circuit 111 and acquiring circuit 109. If the PF is not smaller than an expected value, the process returns to step S2 as discussed above. Otherwise, if the PF is smaller than the expected value, the process returns to step S1 as discussed above.

In step S4, the microprocessor 113 decreases the firing angle in order to step up output voltage. Thus, the induction can obtain normal operation. Then the process returns to step S2.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that: a) the word "comprising" does not exclude the presence of other elements or acts than those listed in the given claim; b) the word "a" or "an" preceding an element does not exclude the presence of a plurality of such elements; c) any reference signs in the claims do not limit their scope; d) any of the disclosed devices or portions thereof may be combined together or separated into further portions unless specifically stated otherwise; and e) no specific sequence of acts or steps is intended to be required unless specifically indicated.

What is claimed is:

1. A controller for a three-phase induction motor, comprising:
   an exampling circuit configured to check a zero passing point of three-phase source voltages and output a first signal;
   a sensing circuit configured to sense variation in a motor load and output a second signal and a third signal;
   an acquiring circuit configured to check the zero-passing point of motor current and output a forth signal;
   a processing unit configured to receive the first signal from the exampling circuit and compute a firing angle based on the first signal to generate a fifth signal, and to determine whether the three-phase induction motor is operating normally based on the second signal and the third signal from the sensing circuit, and the forth signal from the acquiring circuit;
   a firing circuit configured to receive the fifth signal from the processing unit and output a sixth signal based on the fifth signal; and
   an AC to AC converter configured to drive the three-phase induction motor based on the sixth signal.

2. The controller according to claim 1, wherein the processing unit decreases the firing angle when the second and third signals are high, and the forth signal is low.

3. The controller according to claim 1, wherein the processing unit calculates a power factor, when the second signal is low, the third signal is high, and the forth signal is low.

4. The controller according to claim 3, wherein if the power factor is less than an expected value, the processing unit increases the firing angle.

5. The controller according to claim 1, wherein the exampling circuit, the sensing circuit, the acquiring circuit, and the firing circuit include one or more components selected from the group including of resistors, capacitors, inductors, opto-isolators, triacs, and thyristors.

6. The controller according to claim 1, wherein the exampling circuit comprises a resistor connected with source line-voltage or a neutral line, a single-phase bridge rectifier, an opto-isolator, a resistor across the output and DC supply of the opto-isolator, a capacitor across the output and ground of the opto-isolator, and a capacitor across the DC supply and ground of the opto-isolator.

7. The controller according to claim 1, wherein the sensing circuit comprises two diodes, two opto-isolator; four resistors, wherein a first resistor is connected in series with a motor winding and the first diode, wherein a second resistor in connected in series with a source line-voltage and the second diode, wherein a third resistor is across the output and the DC supply of a first opto-isolator wherein a fourth resistor is across the output and the DC supply of a second opto-isolator, and four capacitors, wherein a first capacitor is across the output and ground of the first opto-isolator, a second capacitor is across the DC supply and ground of the first opto-isolator, a third capacitor is across the output and ground of the second opto-isolator, and a fourth capacitor is across the DC supply and ground of the second opto-isolator.

8. The controller according to claim 1, wherein the acquiring circuit comprising:
a resistor connected with a motor winding or a source line-voltage;
a resistor across the output and the DC supply of the opto-isolator;
a single-phase bridge rectifier; and
two capacitors, wherein a first capacitor is across the output and ground of the opto-isolator, and wherein a second capacitor is across the DC supply and ground of the opto-isolator.

9. A method for controlling a three-phase induction motor, the method comprising:
checking, by an exampling circuit, a zero passing point of three-phase source voltages and outputting a first signal;
sensing, by a sensing circuit, variation in a motor load and outputting a second signal and a third signal;
checking, by an acquiring circuit, the zero-passing point of motor current and outputting a forth signal;
receiving, by a processing unit, the first signal and computing a firing angle based on the first signal;
generating, by the processing unit, a fifth signal;
determining, by the processing unit, whether the three-phase induction motor is operating normally based on the second signal and the third signal from the sensing circuit, and the forth signal from the acquiring circuit;
receiving, by a firing circuit, the fifth signal and outputting a sixth signal based on the fifth signal; and
driving, by an AC to AC converter, the three-phase induction motor based on the sixth signal.

10. The method according to claim 9, wherein the processing unit decreases the firing angle when the second and third signals are high, and the forth signal is low.

11. The method according to claim 9, wherein the processing unit calculates a power factor, when the second signal is low, the third signal is high, and the forth signal is low.

12. The method according to claim 11, wherein if the power factor is less than an expected value, the processing unit increases the firing angle.

* * * * *